United States Patent [19]
Stoltman

[11] 3,814,537
[45] June 4, 1974

[54] TURBINE NOZZLE CONTROL
[75] Inventor: Donald D. Stoltman, Henrietta, N.Y.
[73] Assignee: General Motors Company, Detroit, Mich.
[22] Filed: Sept. 22, 1972
[21] Appl. No.: 291,213

[52] U.S. Cl. ................ 415/36, 60/39.17, 60/39.25, 415/160
[51] Int. Cl. .......................................... F01b 25/06
[58] Field of Search .......... 60/39.17, 39.25; 415/36, 415/110, 160

[56] References Cited
UNITED STATES PATENTS

| | | | |
|---|---|---|---|
| 3,168,810 | 2/1965 | Gatzemeyer et al. | 60/39.25 |
| 3,181,295 | 5/1965 | Pauwels et al. | 60/39.25 |
| 3,243,596 | 3/1966 | Loft | 60/39.25 |
| 3,678,691 | 7/1972 | Shohet et al. | 60/39.17 |
| 3,729,928 | 5/1973 | Rowen | 60/39.17 |

*Primary Examiner*—C. J. Husar
*Attorney, Agent, or Firm*—Paul Fitzpatrick

[57] ABSTRACT

A gas turbine engine of the gas-coupled type has a variable nozzle for the power turbine. The nozzle vane angle is controlled by a servo system which provides power actuation of the vanes and which responds to a primary input of power demand to establish a normal steady-state blade angle curve as a function of engine power output. The system opens the nozzle to an accelearation position in response to acceleration of the engine and also further opens the nozzle to a reverse or braking position in response either to movement of the power control to idle with the power turbine above a minimum speed level or to excessive speed or acceleration of the power turbine. The servo system includes a primary control valve and a slave valve and means including a duty cycle controlled solenoid valve to override the normal blade angle control curve and provide the inputs for acceleration and braking. The primary control valve embodies a pintle laterally shiftable in a cylinder to differentially throttle two orifices to establish a variable control pressure to operate the slave valve.

8 Claims, 5 Drawing Figures

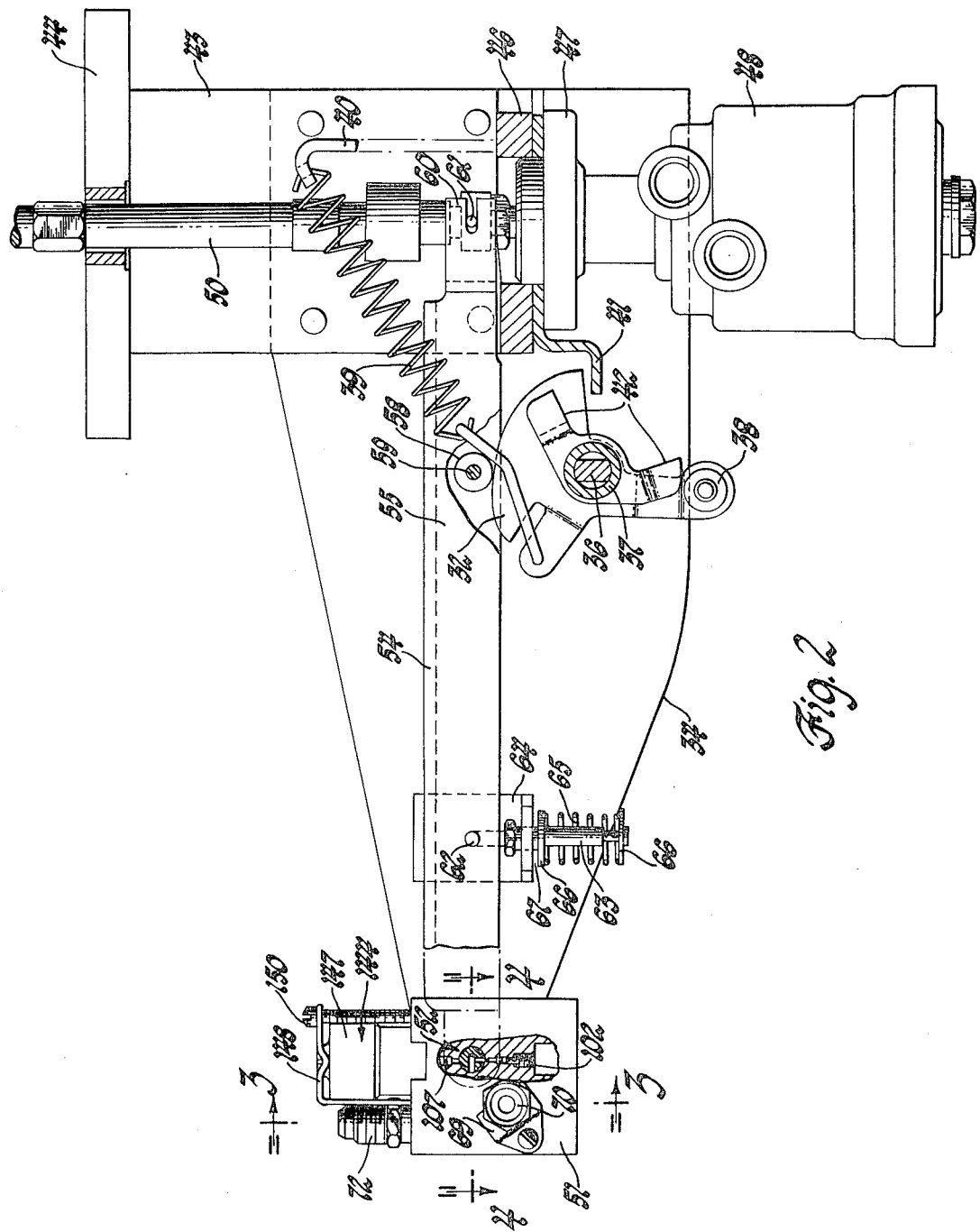

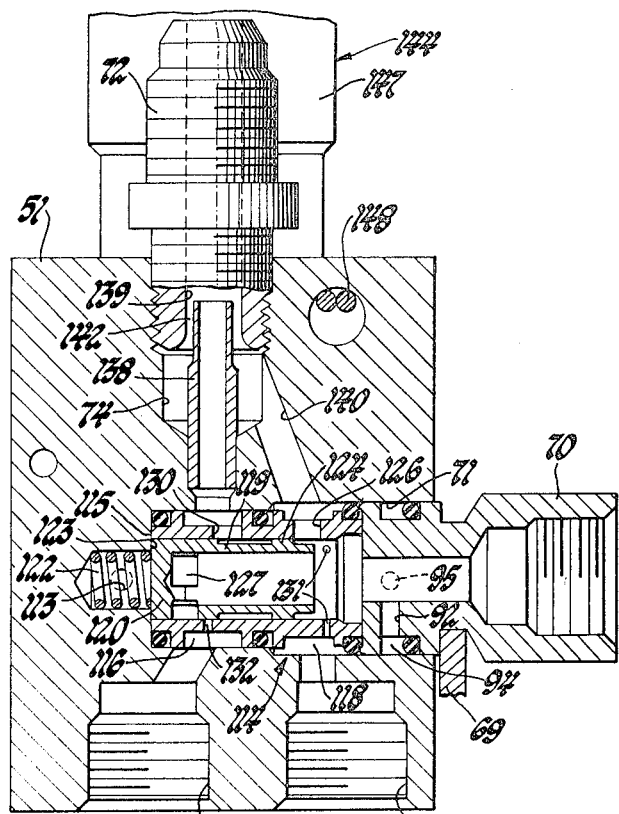

TURBINE NOZZLE CONTROL

INTRODUCTION

My invention is directed to improvements in controls of the power turbine nozzle of gas-coupled gas turbine engines. It has long been realized that it is highly desirable to vary the setting angle of the vanes of the power turbine of such an engine to improve economy of operation at various power levels; to increase the pressure drop across the gas generator turbine for acceleration of the gas generator; and to reverse the direction of swirl of the motive fluid entering the power turbine to brake the load to which the engine is connected and to provide protection against overspeed of the power turbine due to loss of load or other cause.

To explain this more fully: the annular nozzle vane cascade of the power turbine receives the gas flow and the vanes direct the flow with a tangential component into the rotor of the power turbine. As the vanes are shifted to increase the swirl, they also decrease the area of the nozzle. Changing the area of the nozzle varies the distribution of pressure drop between the gas generator turbine and power turbine and serves as a means for adjusting the flow capacity of the engine to varying airflow consonant with different energy levels of operation.

For example, it is desirable to open the turbine nozzle slightly from its minimum area at idling condition of the engine to achieve maximum pressure drop across the gas generator turbine, very little energy being required by the power turbine under these circumstances. Then, as power level increases, it may be desirable to close the power turbine nozzle to reduce the pressure drop across the gas generator and to increase the pressure drop and therefore velocity of flow to the power turbine. At higher levels, such as full power operation with greater speed of the gas generator and higher gas flow, the nozzle may preferably be opened again to some extent.

The characteristics of a gas-coupled gas turbine are such that, assuming the engine is running at or near idle and it is desired to take on a substantial load, it is desirable to spend most of the available energy to accelerate the gas generator first rather than to accelerate the gas generator slowly while delivering a relatively large portion of energy to the power turbine. For this reason, it is desirable to open the turbine nozzle to increase pressure drop and energy available for acceleration in the gas generator turbine.

Also, as previously known, if the nozzle vanes of the power turbine are rotated substantially beyond the maximum open position so that the swirl of air to the power turbine is reversed, the gas flow may be used as a means for braking a vehicle by energy from the engine as an aid to or an alternative to the ordinary wheel brakes.

Also, in a vehicle installation, if for example there is a loss of traction, there may be rapid acceleration of the power turbine which could be self-destructive. Such rapid acceleration may also be terminated and the power turbine brought under control by reversing the turbine nozzle.

It will be seen from the foregoing that the utility of and the general principles of varying the nozzle of a power turbine have been known, but there remains a need for better systems to accomplish such control with greater economy, accuracy, flexibility, and reliability.

My invention is directed to providing what I consider to be an improved arrangement of a turbine nozzle control having features of simplicity, reliability, and flexibility of operation, as well as inexpensive production costs such as to make it highly suitable for use in automotive and other vehicle installations.

The principal objects of my invention are to provide an improved turbine nozzle control for a gas-coupled gas turbine engine; to improve the operation of automotive vehicles powered by gas turbines; to provide a simple, reliable, and inexpensive control system for a gas turbine nozzle; and to provide an improved hydraulic servo system suitable for such purposes.

The nature of my invention and its advantages will be clear to those skilled in the art from the succeeding detailed description of the preferred embodiment of the invention and the accompanying drawings thereof.

FIG. 2 is a plan view of a servomechanism assembly, with parts cut away.

FIG. 3 is a sectional view of the valve block taken on the plane indicated by the line 3—3 in FIG. 2.

FIG. 4 is a sectional view of the servo control valve taken on the plane indicated by the line 4—4 in FIG. 2.

FIG. 5 is a partial sectional view of the valve mechanism taken on the plane indicated by the line 5—5 in FIG. 4.

Figure 1:
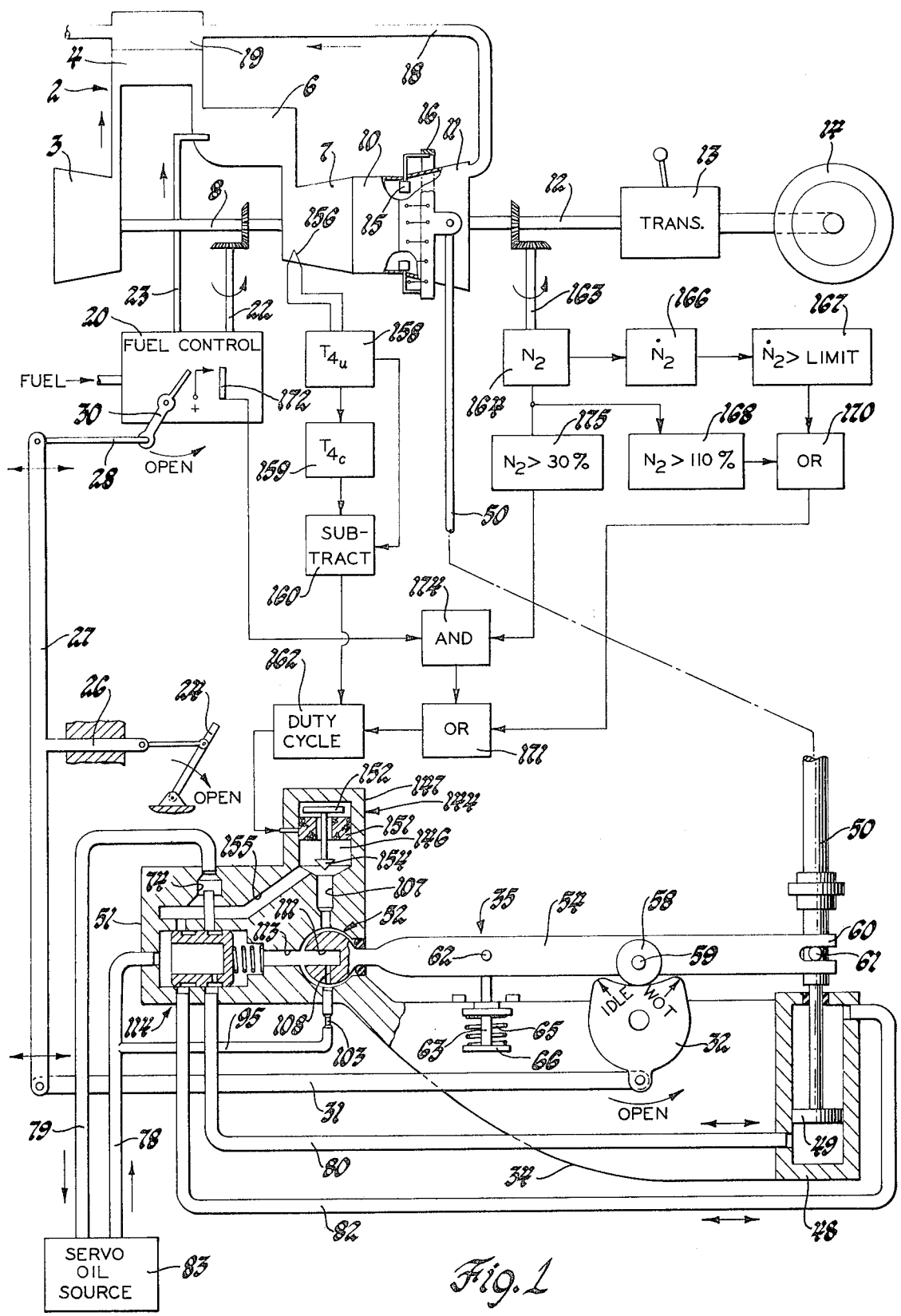
FIG. 1 is a schematic diagram of my control system associated with a gas turbine vehicle power plant.

Referring first to FIG. 1 for a general description of the preferred type of power plant and the general overall nature of the preferred control system, a gas-coupled gas turbine engine 2 includes a compressor 3 which supplies compressed air through a cold air pass 4 of a regenerator and a combustion apparatus 6 to a first or gas generator turbine 7. The gas generator turbine drives the compressor through a shaft 8. The exhaust from the gas generator turbine flows through a duct 10 into a second or power turbine 11 which drives, through a power output shaft 12 and a suitable manual or automatic transmission 13, a load which is illustrated as the driving wheels 14 of a motor vehicle. The power turbine includes a nozzle having a ring of variable setting vanes 15 concurrently adjusted by a ring 16 rotatable around the axis of the turbine and coupled to each vane. Since such variable vane structures are quite well known in the art, no attempt will be made here to describe the details of one. Examples are described in Mason U.S. Pat. No. 3,542,484, Nov. 24, 1970 and Wall U.S. Pat. No. 3,558,237, Jan. 26, 1971.

The exhaust from turbine 11 flows through an exhaust duct 18 and hot gas pass 19 of the regenerator to exhaust. Fuel is supplied to the engine from a suitable source through a fuel control 20 which may be of any suitable known type and which may include speed responsive devices, temperature responsive devices, or other suitable instrumentalities to regulate the fuel supplied to the engine to achieve the desired power level and to avoid overspeeding or overheating of the engine, and so on, as is well known to those skilled in the art. The fuel control includes a speed input from the gas generator through a shaft 22 geared to the gas generator which may operate a fuel pump as well as a governor or other speed responsive fuel control device. The fuel metered by the fuel control is supplied through a line 23 to the combustion apparatus.

The fuel control is controlled by the operator of the vehicle to provide a desired power level of the gas generator which may be defined in terms of speed or temperature of the gas generator. In normal operation, speed will range from roughly fifty percent full speed for idle up to 100 percent full speed for maximum power output for a typical engine.

DESCRIPTION OF THE NOZZLE CONTROL SYSTEM

As illustrated schematically, the fuel control is regulated by an operator operated pedal or accelerator pedal 24 connected through a sliding rod 26 and a crossarm 27 and link 28 to an arm 30 which provides the input to the fuel control 20. The legend "OPEN" indicates the direction in which the arm 30 is moved to increase power to "open the throttle" of the vehicle.

The crossarm 27 is also shown connected through a link 31 with a cam 32 rotatably mounted on a fixed support 34. The cam provides the basic control schedule of the setting angle of turbine vanes 15 for normal steady-state operation as appropriate to the characteristics of the engine. Cam 32 and support 34 are parts of a vane servo 35 (shown greatly exaggerated in scale on the schematic), the details of which will now be described with reference to FIG. 1 and the other figures. The linkage interconnecting the fuel control and cam 32 may take any suitable form. The fuel control may be mounted on support 34 in practice.

FIG. 2 is a realistic showing of the servo-mechanism illustrated schematically in FIG. 1, and FIGS. 3, 4, and 5 show details of the hydraulic system. FIG. 2 illustrates the support 34 and the cam 32, the latter being mounted for rotation about the shaft or axis 36 with a sleeve 37. Cam 32 includes an arm which bears a ball stud 38 to which the throttle linkage is connected; that is, the linkage to the accelerator pedal and fuel control. The cam may be biased towards idle position by a tension spring 39 connected to a bracket 40 on the support and to an arm extending integrally from the cam. A stop 41 fixed on the support is engageable by arms 42 fixed to sleeve 37 which determine the limits of rotation of the cam. The support 34 includes a bracket 43 terminating in a flange 44 by which it is mounted on the engine, that is, the turbine case of turbine 11. Bracket 43 includes a flange portion 46 to which the mounting flange 47 of a double-acting hydraulic motor or power cylinder 48 is fixed. The power cylinder includes a piston 49 which reciprocates a piston rod 50 which is connected to the vane adjusting ring 16. The piston rod is ordinarily made up of several sections, but this is immaterial to my invention.

A valve block 51 is mounted on the opposite end of support 34 from the cylinder 48. This valve block contains the hydraulic valve mechanism which controls flow of fluid to the cylinder 48. The valves include a servo control valve or pilot valve assembly 52. The piston rod 50 is connected to a movable valve pin 53 of valve 52 by a feedback linkage including a lever 54, which also provides the input to the servo system from cam 32. The intermediate portion 55 of lever 54 is of channel section and mounts a cam follower roller 58 on a shaft 59. This roller engages the contoured perimeter of cam 32. The right hand end of lever 54 as illustrated defines a clevis 60, the arms of which straddle a crosspin 61 extending through the piston rod 50. Movement of either cam 32 or piston rod 50 tends to move the lever 54 so as to move the servo valve pin 53, as will be explained below in greater detail. It may be mentioned here, however, that the travel of valve pin 53, which is in the direction of the plane of FIG. 2, is very slight, of the order of six or seven thousandths of an inch. The follower 58 is normally held in engagement with cam 32 by action of the power cylinder, so that the fulcrum of the lever is at shaft 59.

However, for acceleration and for braking, the fulcrum shifts to a floating pivot 62. Pivot 62 extends laterally from a post 63 slidable in a hole in an L-shaped bracket 64 fixed to support 34. A compression spring 65 is bridled between retainers 66 slidable toward each other but held against separation by shoulders on the post 63.

In normal steady-state operation, there is a clearance indicated at 67 between the near retainer 66 and the bracket 64, so that spring 65 is entirely ineffective. However, the system may override or supersede cam 32, in which case rod 50 moves upward as illustrated to close the clearance 67 and provide a fulcrum at 62 for lever 54. This provides for the acceleration setting of the turbine nozzle.

When the control is used to brake the power turbine, there is further travel of rod 50 accompanied by compression of spring 65. These actions will be further explained.

Normally, movement of the cam 32 in response to movement of the power control 24 or travel of piston rod 50 will shift the control valve 53 within the valve block 51. The normal operation of the servomechanism is to control the cylinder so that valve pin 53 is maintained close to a particular position in its rather limited range of travel so that the cylinder moves the piston rod and thereby the nozzle vanes to follow the commands transmitted from the power control 24 through cam 32.

Now let us consider the preferred structure of the valving and associated mechanisms contained in or mounted on the valve block 51 with reference to FIG. 2 and more particularly to FIGS. 3, 4, and 5. The valve block 51 is approximately a rectangular polyhedron. It is bored and tapped and provided with suitable fittings for flow of fluid. A fitting 70 mounted in a bore 71 in the body and retained by a clip 69 provides for connection of a servo oil supply line from a pump. A fitting 72 screwed into the tapped portion of a bore 74 in the valve block provides for connection of the oil return line. Two tapped holes 75 and 76 provide for connection of the fluid lines to the cylinder 48. As illustrated in FIG. 1, these four lines are respectively 78, 79, 80, and 82. The servo oil source 83 illustrated in FIG. 1 is preferably such as to provide a reasonably constant flow of servo oil under sufficient pressure to overcome any resistance to the movement by the turbine nozzle vanes. The servo oil source may, as is clear to those skilled in the art, be the hydraulic power steering system of a vehicle. In this case the turbine nozzle servo system is connected in series with the power steering servo. My servo system permits constant oil flow in all positions of the valve mechanism.

Referring now to the servo valve assembly 52, the valve pin 53 is mounted in a straight bore 84 extending through the valve block 51. The valve pin is generally of circular cross section, having heads 85 and 86 at the ends and having a land 87 near the head 86. The head 85 is substantially the same diameter as the bore 84 but sufficiently smaller to allow the valve pin to pivot about this head as a center of rotation. A pivot pin 88 disposed in a bore 89 intersecting bore 84 at a right angle provides a fulcrum for the movement of valve pin 53 to effect its controlling action. The head 86 is disposed outside the valve block and includes a portion which fits within a bore in the lever 54, the lever being retained by a snap ring 90 mounted in a groove in the head 86. Fluid under pressure is contained within the bore 84 by O-rings 91 bearing against the heads of pin 53.

When oil under pressure is supplied to the servo valve 52 through the inlet fitting 70, a hole 92 through the wall of this fitting admits oil into an annulus 94 within bore 71, sealed by an O-ring. A drilled passage 95 (see also FIG. 5) conducts this oil to a stepped bore 96 within the valve block which is perpendicular to and intersects the bore 84 at valve pin land 87. The lower end of bore 96 is closed by a plug 102. A calibrated orifice 103 (see also FIG. 1) is seated against a step in the bore 96. Thus flow from the source 83 to valve 52 creates a pressure loss at the orifice 103.

The land 87 on valve pin 53 has four flats 104 which leave between them cylindrical surfaces at the top, bottom, and sides of the pin as is clearly shown in FIG. 5. Pin 85 is shown about four times size in FIGS. 4 and 5. The land 87 has about 0.003 inch radial clearance in bore 84. Thus, the land 87 can move down against the fluid inlet 106 from bore 96 or upwardly against an outlet bore 107 which is coaxial with bore 96. The valve pin 53 has a passage 108 aligned with inlet 106 extending into the valve pin, this passage defining a second orifice 110. Flow through orifice 110 may be discharged through a relatively large lateral passage 111 in the valve pin which intersects passage 108 and discharges through a slot 109 into bore 84. Therefore, flow from 106 to 107 is throttled primarily at the inlet 106 as the valve pin moves downward in FIG. 5 or primarily at the outlet 107 as the valve pin moves upward in FIG. 5, and the two orifices or throttling ports are alternatively or reversely varied. The pressure between the two ports is thus varied by movement of the valve pin. This pressure, which may be called the control pressure, fills the bore 84 around the pin 53. The control pressure is a function of the drop through orifice 103 and, in some positions of pin 53, also orifice 110. The control pressure is communicated from bore 84 through a damping orifice 112 and a bored passage 113 to the slave valve assembly 114 to be described.

Referring specifically to FIG. 3 for the slave valve assembly 114, this includes a valve sleeve 115 in the bore 71 retained by the fitting 70. O-rings and flanges on the valve sleeve bound two fluid annuli 116 and 118 between the sleeve and the wall of bore 71 which are in direct communication with the cylinder ports 75 and 76 respectively. A hollow valve spool 119 closed at its inner end by a head 120 is reciprocable in sleeve 115. Servo fluid under full pressure bears against the right hand face of valve spool 119 as illustrated in FIG. 3. The control pressure transmitted through passage 113 into the closed end of bore 71 biases the spool in the other direction, as also does a compression spring 122 contained in the end of bore 71. The position of valve spool 119 thus is determined by the difference between the servo oil pressure and the control pressure and the characteristic of spring 122. Normally, the valve floats to the right of the extreme left position illustrated, clear of the shoulder 123. Assuming that the valve is floating near the center of its range of operation, a land 124 on the valve spool throttles radial ports 126 through the sleeve which communicate with the annulus 118. A ring of ports 127 through the spool communicates through ports 130 in the sleeve with the annulus 116. These ports are varied inversely in area by reciprocating movement of the valve spool.

The sleeve defines small ports 131 and 132 which normally maintain open communication between the inlet and the two lines to the cylinder 48. These minimize the abruptness of the throttling if the valve spool approaches the limits of its travel. Ports 131 are blocked when spool 119 engages fitting 70 at one end of its range of travel and ports 132 are closed as the spool approaches shoulder 123.

Annulus 116 and port 75 are in open communication with a jet or nozzle 138 which is concentric with bore 74 and enters the internal passage 139 in return fitting 72. Annulus 118 and port 76 are connected by a passage 140 with the bore 74 and thus with an annular nozzle 142 defined between the nozzle 138 and the bore 139. This structure constitutes what I call a reciprocal jet pump, the point being that flow through either nozzle 138 or nozzle 142 tends to energize the flow through the other nozzle. Thus, when spool 119 moves off center to direct the major portion of the flow to either annulus, the drop through the nozzle connected to that annulus increases the pressure in the corresponding cylinder line. The pumping action of the jet pump reduces the pressure in the other cylinder line. The resulting pressure difference displaces the piston 49.

The remaining item of consequence associated with the valve block is a solenoid valve 144 which may be of a well-known type in which current flowing through a coil generates a magnetic field which pulls on an armature and thus urges a movable valve member against its seat. This structure is illustrated sechmatically in FIG. 1 and in outline in FIGS. 2 and 3. The passage 107 from the servo valve enters a chamber 146 within a solenoid valve housing 147 which is held against the upper surface of the valve block by a retainer clip 148 and a screw 150. The end of the retainer clip which is not held by the screw is lodged in an opening in the block 51. Current supplied to a solenoid 151 draws on armature 152 to press movable valve poppet 154 against the seat at the outlet of passage 107. Chamber 146 communicates through a passage 155 with the bore 74.

Preferably, the valve 144 is operated on a form of duty cycle control, which means that current is supplied to the solenoid in periodic pulses of constant amplitude and variable duration. The resistance to flow through the valve is a function of the duration of the current pulses. If the duty cycle is zero, there is no force tending to close valve 144 and, as the duty cycle increases, the back pressure or resistance to flow due to the valve increases. At the limit, 100 percent duty cycle, the valve completely blocks flow through passage 107 and therefore prevents any pressure drop through orifice 103 and valve 52.

Control of this valve is used to facilitate acceleration of the gas generator and to provide for braking of the power turbine. The system to take care of this is shown on FIG. 1.

The turbine inlet temperature is sensed by one or more thermocouples 156 connected to an amplifier 158 which provides an output electrical potential proportional to the thermocouple reading of temperature, which may be called uncorrected turbine inlet temperature. The output of amplifier 158 is fed to a correcting circuit 159 which compensates rather closely for the time lag of the thermocouple and provides an output potential corresponding to corrected turbine inlet temperature which reflects the actual gas temperature during transients. The corrected turbine inlet temperature ordinarily is used for fuel control, but this is immaterial to my present invention. Since the two quantities are available, I make use of them as a means to indicate increases in power level of the gas generator or, in other words, acceleration. This is done by feeding the outputs from devices 158 and 159 corresponding to uncorrected and corrected turbine inlet temperatures to a subtracting circuit which may, for example, be an operational amplifier with differential inputs. If corrected temperature is significantly higher than uncorrected temperature, this is an indication of increasing temperature and therefore of an increase in fuel supply to accelerate the gas generator. The output of the subtracting circuit 160 is one input to a duty cycle generator 162 which responds to control the solenoid valve 144. Specifically, this input initiates 70 percent duty cycle output of the generator.

The power turbine drives, through accessory drive shafting 163, a power turbine speed transducer 164 which might, for example, be a tachometer generator and which provides an electrical output such as potential or frequency proportional to power turbine speed. The speed signal is fed to a differentiator 166 which provides a signal proportional to gas generator acceleration. This signal is used to sense the beginning of a runaway or overspeed condition of the power turbine and to provide appropriate response by adjusting the power turbine nozzle to brake the power turbine. This is accomplished through a limit circuit 167 which provides an output whenever the acceleration is over a particular value which is above the normal level of acceleration of the power turbine in operation of the vehicle and therefore indicates the need for corrective measures.

The power turbine also is braked whenever its speed becomes greater than 110 percent of the rated maximum, this being accomplished by feeding the power turbine speed signal to a limit circuit 168 which provides an output when the turbine speed input increases above a preset value corresponding to 110 percent rated speed. Circuits 167 and 168 may be suitable prior art comparison circuits. The outputs from circuits 167 and 168 are fed to an OR gate 170 which provides an output whenever either acceleration or speed of the power turbine exceeds its preset limit. OR gate 170 is connected to the duty cycle generator 162 through a second OR gate 171 so that whenever OR gate 170 is energized a signal is transmitted from OR gate 171 to the duty cycle generator to cause the generator to provide a 100 percent duty cycle calculated to cause the turbine nozzles to go to the reverse position for braking.

Braking by the power turbine also may be desired to retard the vehicle driven by the turbine during normal operation. This preferably is effected in response to a closed throttle or idle power signal when the power turbine speed is above some minimum value. As illustrated, the normally open switch 172 connects a source of potential indicated by + to an AND gate 174 whenever the power control is returned to the idle position. The AND gate receives a signal responsive to power turbine speed from a comparison circuit 175 which receives an input from the transducer 164 and provides and output signal when power turbine speed is greater than thrity percent of normal, in the particular case. Thus, when both inputs to the AND gate are positive, the AND gate provides a braking signal into the OR gate 171. To summarize, a braking signal is fed to the duty cycle generator 162 (1) upon overspeed of the power turbine, (2) upon excessive acceleration of the power turbine, and (3) upon return of the fuel control to idle position as long as the gas generator speed is greater than thirty percent rated. If desired for engine braking of the vehicle with the engine running above idle, a "brake" input to the OR gate 171 independent of those described above may be provided.

The duty cycle generator 162 may be a circuit according to known practice which provides an On period during each cycle proportional to a potential supplied to the duty cycle generator. In this case, the signal supplied from the subtracting circuit 160 is of less magnitude than that supplied from the OR gate 171 so that, in the particular case, the acceleration signal provides a 70 percent duty cycle and the braking signal a 100 percent duty cycle. When there is no input to the duty cycle generator, the duty cycle is zero and the solenoid 151 is deenergized completely.

It may be noted that O-ring 91 is believed to assist in centering valve pin 53, that is contributing some bias away from its limit positions where land 87 engages the surface of bore 84.

OPERATION OF THE CONTROL SYSTEM

The operation of the control system may be clear to those skilled in the relevant arts from the above description, but it seems desirable to present the mode of operation in a coherent manner now that the structure has been described. Referring to FIG. 1, first let us assume that the engine has been started, the gas generator is idling, and little or no effective power is being taken from the power turbine. The power turbine might be braked or it might be operating at low speed to drive accessory loads, for example. In this condition, the vane angle cam 32 will be rotated clockwise from its position shown in FIG. 2 so that the follower 58 is riding near the left end of the cam surface, which is of greater radius then the minimum area or maximum blade angle position in which the cam is shown.

With the power control at idle position, switch 172 will be closed but at low power turbine speed and with no significant increasing transient in turbine inlet temperature, there is no input to the duty cycle generator, and solenoid valve 144 will be open. Servo fluid is supplied to inlet fitting 70 from the source 83, which may include a pump driven by one or the other turbine. Servo oil thus flows continuously through orifice 103 and servo valve 52 to return line 79 which we may assume to be at substantially zero gauge pressure. Leaving aside for the moment the effect of valve 52, the pressure drop through orifice 103 will establish a control pressure biasing the slave valve spool 119 which is insufficient to move the spool to its center or neutral position. The valve will remain biased toward a position in which the major part of the servo fluid is supplied to port 76 and through line 82 to the cylinder, acting to close the turbine nozzle vanes. However, as the piston rod 50 moves downwardly as illustrated to close the vanes, the lever 54 rocks about its fulcrum at 59 on the cam, thus moving valve pin 53 upward as illustrated to throttle the outlet from valve 52 into passage 107. This causes a reduction of flow through orifice 103 and an increase in the control pressure, acting on valve spool 119 to reduce the pull exerted by piston 49. If the piston rod reverses slightly, the flow through valve 52 increases and the control pressure correspondingly drops. The piston therefore holds the follower 59 in engagement with the cam and valve pin 53 close to the outlet 107, maintaining a balanced condition in the hydraulic system. Whatever force is required to hold the vanes in this position against gas loads will be exerted by the power cylinder.

Now, if the operator acts to slowly increase the power level of the gas generator, cam 32 is rotated counterclockwise and piston 49 retracts piston rod 50, increasing the turbine blade angle and descreasing the area of the turbine nozzle. If the cam is slowly rotated past the position illustrated in FIG. 2, the follower rises and the corresponding follow-up action causes the turbine vane angle to decrease and turbine nozzle area to increase. The follow-up action is based upon the throttling of flow through orifice 103 by the servo valve 52 which maintains the desired or necessary pressure differential in cylinder 48.

At this time, as at all other times, the substantial flow of fluid through the system proceeds through the nozzles 138 and 142 and into the return line 79. Whatever pressure differential is required in cylinder 48 to overcome friction to move the vanes or to overcome gas loads to hold them in position will be provided by movement of the slave valve spool to one side or the other of its neutral position in response to the changes in the control pressure relative to the servo fluid inlet pressure which are effected by the servo control valve 52.

Now let us assume that the operator, instead of very slowly increasing the power level from idle, operates the power control 24 quickly to call for higher power operation of the gas generator. In this case, the cam 32 is moved, but the normal follow-up action is overridden for the time being by the acceleration signal. With the throttle burst the fuel is increased rather sharply, turbine inlet temperature goes up rapidly, and the difference between corrected and uncorrected turbine temperature is substantial. The result is an input from the subtract circuit 160 into the duty cycle generator which, in the particular system, as calibrated, causes the duty cycle generator to operate on a 70 percent cycle which results in substantial opposition by the solenoid valve 144 to flow through orifice 103 and servo valve 52. The pressure drop through valve 154, which is downstream of the line 113 to the slave valve assembly, increases the control pressure causing the slave valve piston to move to the right as illustrated in FIG. 3, and to supply the predominant pressure through line 80 to the cylinder to cause the piston rod 50 to move to decrease blade angle; that is, to open the turbine nozzle.

As rod 50 moves upwardly as viewed in FIG. 2, the follower 59 is lifted from cam 32 and lever 54 swings about the servo valve pin 53 as a temporary pivot. This action raises the pivot 62 until the clearance at 67 between the bracket 64 and abutment 66 of the bridled spring is closed. The bridled spring is not further compressed by this action, and the pivot pin 62 now provides a fulcrum for the feedback lever 54. Thus, continued movement upward of rod 50 as illustrated moves valve pin 53 downward as illustrated in FIG. 5 to cause it to bear against the inlet 106 to the servo valve. Flow from the inlet to the slave valve is now throttled by orifice 103 and orifice 110 in series. Orifice 110 is smaller than orifice 103. This results in a greater pressure drop and a lowering of the control pressure so that the servo system finds an equilibrium at the position where valve pin 53 is near the downward limit of its movement of travel and the clearance 67 at the bridled spring remains closed. With the valve pin 53 seated tightly against the inlet 106, the pressure drop is sufficiently great to cause the slave valve to operate to pull the rod slightly into the cylinder. This action, of course, relieves the force biasing pin 53 against the incoming fluid and tends to allow some leakage around the pin, by-passing the orifice 110. The vanes are stabilized at a fixed position wider open than the normal operating position controlled by cam 32. As long as the acceleration signal persists, this condition will continue.

As the gas generator stabilizes at its new operating speed and temperature becomes constant, the acceleration signal is terminated and solenoid valve 146 reopens, restoring the control to the mode previously described of cam 32. The rod 50 is retracted to bring the roller into contact with the cam and the nozzle angle and nozzle opening will be as called for by the normal schedule.

If, for some reason, for example slipping of the vehicle drive wheels on an icy spot on the road, the power turbine tends to overspeed or accelerate at an abnormally high rate, a signal is supplied through the OR gate 171 to the duty cycle generator to create a 100 percent duty cycle on the solenoid valve. At this energization of the valve, the valve is closed completely and, since there is no flow through the orifice 103 and the orifices defined by the servo control valve, the control pressure supplied to the slave valve will be equal to the servo fluid inlet pressure. In this condition the slave valve moves fully to the right as illustrated in FIG. 3 to provide maximum force to the piston to push the vane adjusting ring 16 to the position of maximum reverse angle of the vanes. Some stop, either in the turbine or in the hydraulic motor system, will limit the movement of the piston. This movement will be accomplished with the feedback arm 54 swinging about the valve pin 53 as a fulcrum, the bridled spring 65 being compressed. The valve pin 53 is thus held in position against the inlet 106 but, since there is no flow through the valve to return, the pressure delivered to the slave valve remains at full pressure level. When the overspeed or overacceleration is terminated, the solenoid valve 147 reopens to restore normal control to the device.

The same form of reverse vane angle control is effected when the fuel control is returned to the idle position as long as the power turbine is operating at over 30 percent rated speed through the AND gate 174, OR gate 171, and duty cycle generator 162.

I believe it will be apparent to those skilled in the art from the foregoing that I have devised a novel, flexible, and very simple means for accomplishing the desired results in gas turbine nozzle control.

The detailed description of the preferred embodiment of the invention for the purpose of explaining the principles thereof is not to be considered as limiting or restricting the invention, since many modifications may be made by the exercise of skill in the art.

I claim:

1. A power turbine nozzle vane angle setting system for a gas turbine engine comprising, in combination, control means operable to set an engine power level demand; a power cylinder having a movable member connectable to vane angle setting means; a fluid pressure operated slave valve controlling flow of servo fluid to the power cylinder; a servo valve for controlling the slave valve; a feedback lever connecting the movable member to the servo valve; cam means activated by the control means providing a movable first fulcrum for the feedback lever to establish a curve of vane angle as a function of power level demand; stop means providing a second fulcrum for the feedback lever; a source of servo fluid under pressure; means defining a restricted connection from the source to the servo valve; the servo valve including means to vary the operating pressure of the slave valve comprising two members moved relatively by the feedback lever, the members defining two fluid paths each restricted by such relative movement, one path being restricted by relative movement of the first fulcrum and the movable member and the other path being restricted by movement of the movable member relative to the second fulcrum, the said restricted paths being connected in series between the source of servo fluid and a return line, and the slave valve being exposed to the pressure between the said restricted paths.

2. A power turbine nozzle vane angle setting system for a gas turbine engine comprising, in combination, control means operable to set an engine power level demand; a power cylinder having a movable member connectable to vane angle setting means; a fluid pressure operated slave valve controlling flow of servo fluid to the power cylinder; a servo valve for controlling the slave valve; a feedback lever connecting the movable member to the servo valve; cam means activated by the control means providing a movable first fulcrum for the feedback lever to establish a curve of vane angle as a function of power level demand for normal steady-state operation of the engine; stop means providing a second fulcrum for the feedback lever, the second fulcrum being biased to a position effective to establish a vane angle for acceleration of the engine and the fulcrum being yieldable to provide for overtravel to provide a reversed vane angle; a source of servo fluid under pressure; means defining a restricted connection from the source to the servo valve; the servo valve including means to vary the operating pressure of the slave valve comprising two members moved relatively by the feedback lever, the members defining two fluid paths each restricted by such relative movement, one path being restricted by relative movement of the first fulcrum and the movable member and the other path being restricted by movement of the movable member relative to the second fulcrum, the said restricted paths being connected in series between the source of servo fluid and a return line, and the slave valve being controlled by the pressure between the said restricted paths; and controllable means for alternatively opening, throttling, and closing the return line, such that the cylinder is controlled by the cam means when the return line is open, moves to a position determined by the second fulcrum when the return line is throttled, and moves further to a braking position when the return line is closed.

3. A power turbine nozzle vane angle setting system for a gas turbine engine comprising, in combination, control means operable to set an engine power level demand; a fluid motor having a movable member connectable to vane angle setting means; valve means controlling flow of servo fluid to the motor; a feedback linkage connecting the movable member to the valve means; input means actuated by the control means providing a movable first fulcrum for the feedback linkage to establish a curve of vane angle as a function of power level demand; stop means providing a second fulcrum for the feedback linkage; a source of servo fluid under pressure; and means defining a restricted connection from the source to the valve means; the valve means including two parts moved relatively by the feedback linkage, the members defining two fluid paths each restricted by such relative movement, one path being restricted by relative movement of the first fulcrum and the movable member and the other path being restricted by movement of the movable member relative to the second fulcrum, the said restricted paths being connected in series between the said restricted connection and a return line; the valve means including means for reversibly directing fluid to the motor controlled by the pressure between the said restricted paths.

4. A power turbine nozzle vane angle setting system for a gas turbine engine comprising, in combination, control means operable to set an engine power level demand; a fluid motor having a movable member connectable to vane angle setting mmeans; valve means controlling flow of servo fluid to the motor; a feedback linkage connecting the movable member to the valve means; input means actuated by the control means providing a movable first fulcrum for the feedback linkage to establish a curve of vane angle as a function of power level demand for normal steady-state operation of the engine; stop means providing a second fulcrum for the feedback linkage, the second fulcrum being effective to establish a vane angle for acceleration of the engine; a source of servo fluid under pressure; means defining a restricted connection from the source to the valve means; the valve means including two parts moved relatively by the feedback linkage, the members defining two fluid paths each restricted by such relative movement, one path being restricted by relative movement of the first fulcrum and the movable member and the other path being restricted by movement of the movable member relative to the second fulcrum, the said restricted paths being connected in series between the said restricted connection and a return line; the valve means including means for reversibly directing fluid to the motor controlled by the pressure between the said restricted paths; and controllable means for alternatively opening and throttling the return line, such that the cylinder is controlled by the input means when the return line is open and moves to a position determined by the second fulcrum when the return line is throttled.

5. A power turbine nozzle vane angle setting system for a gas turbine engine comprising, in combination, control means operable to set an engine power level demand; a fluid motor having a movable member connectable to vane angle setting means; valve means controlling flow of servo fluid to the motor; a feedback linkage connecting the movable member to the valve means; input means actuated by the control means providing a movable first fulcrum for the feedback linkage to establish a curve of vane angle as a function of power level demand for normal steady-state operation of the engine; stop means providing a second fulcrum for the feedback linkage, the second fulcrum being biased to a position effective to establish a vane angle for acceleration of the engine and the fulcrum being yieldable to provide for overtravel to provide reversed vane angle; a source of servo fluid under pressure; means defining a restricted connection from the source to the valve means; the valve means including two parts moved relatively by the feedback linkage, the members defining two fluid paths each restricted by such relative movement, one path being restricted by relative movement of the first fulcrum and the movable member and the other path being restricted by movement of the movable member relative to the second fulcrum, the said restricted path being connected in series between the said restricted connection and a return line; the valve means including means for reversibly directing fluid to the motor controlled by the pressure between the said restricted paths; and controllable means for alternatively opening, throttling, and closing the return line, such that the cylinder is controlled by the input means when the return line is open, moves to a position determined by the second fulcrum when the return line is throttled, and moves further to a braking position when the return line is closed.

6. A power turbine nozzle vane angle setting system for a gas turbine engine comprising, in combination, control means operable to set an engine power level demand; a fluid motor having a movable member connectable to vane angle setting means; a fluid pressure operated slave valve controlling flow of servo fluid to the power cylinder; a servo valve for controlling the slave valve; a feedback linkage connecting the movable member to the servo valve; input means actuated by the control means providing a movable first fulcrum for the feedback linkage to establish a curve of vane angle as a function of power level demand; stop means providing a second fulcrum for the feedback linkage; a source of servo fluid under pressure; and means defining a restricted connection from the source to the servo valve; the servo valve including means to vary the operating pressure of the slave valve comprising two parts moved relatively by the feedback linkage, the parts defining two fluid paths each restricted by such relative movement, one path being restricted by relative movement of the first fulcrum and the movable member and the other path being restricted by movement of the movable member relative to the second fulcrum, the said restricted paths being connected in series between the said restricted connection and a return line, and the slave valve being controlled by the pressure between the said restricted paths.

7. A power turbine nozzle vane angle setting system for a gas turbine engine comprising, in combination, control means operable to set an engine power level demand; a fluid motor having a movable member connectable to vane angle setting means; a fluid pressure operated slave valve controlling flow of servo fluid to the power cylinder; a servo valve for controlling the slave valve; a feedback linkage connecting the movable member to the servo valve; input means actuated by the control means providing a movable first fulcrum for the feedback linkage to establish a curve of vane angle as a function of power level demand for normal steady-state operation of the engine; stop means providing a second fulcrum for the feedback linkage, the second fulcrum being effective to establish a vane angle for acceleration of the engine; a source of servo fluid under pressure; means defining a restricted connection from the source to the servo valve; the servo valve including means to vary the operating pressure of the slave valve comprising two parts moved relatively by the feedback linkage, the parts defining two fluid paths each restricted by such relative movement, one path being restricted by relative movement of the first fulcrum and the movable member and the other path being restricted by movement of the movable member relative to the second fulcrum, the said restricted paths being connected in series between the said restricted connection and a return line, and the slave valve being controlled by the pressure between the said restricted paths; and controllable means for alternatively opening and throttling the return line, such that the cylinder is controlled by the input means when the return line is open and moves to a position determined by the second fulcrum when the return line is throttled.

8. A power turbine nozzle vane angle setting system for a gas turbine engine comprising, in combination, control means operable to set an engine power level demand; a fluid motor having a movable member connectable to vane angle setting means; a fluid pressure operated slave valve controlling flow of servo fluid to the power cylinder; a servo valve for controlling the slave valve; a feedback linkage connecting the movable member to the servo valve; input means actuated by the control means providing a movable first fulcrum for the feedback linkage to establish a curve of vane angle as a function of power level demand for normal steady-state operation of the engine; stop means providing a second fulcrum for the feedback linkage, the second fulcrum being biased to a position effective to establish a vane angle for acceleration of the engine and the fulcrum being yieldable to provide for overtravel to provide reversed vane angle; a source of servo fluid under pressure; means defining a restricted connection from the source to the servo valve; the servo valve including means to vary the operating pressure of the slave valve comprising two parts moved relatively by the feedback linkage, the parts defining two fluid paths each restricted by such relative movement, one path being restricted by relative movement of the first fulcrum and the movable member and the other path being restricted by movement of the movable member relative to the second fulcrum, the said restricted paths being connected in series between the said restricted connection and a return line, and the slave valve being controlled by the pressure between the said restricted paths; and controllable means for alternatively opening, throttling, and closing the return line, such that the cylinder is controlled by the input means when the return line is open, moves to a position determined by the second fulcrum when the return line is throttled, and moves further to a braking position when the return line is closed.

* * * * *